United States Patent [19]

Cross, Jr.

[11] 3,853,483

[45] Dec. 10, 1974

[54] EXHAUST GAS CATALYTIC TREATMENT SYSTEM

[75] Inventor: Willis J. Cross, Jr., Media, Pa.

[73] Assignee: Air Products and Chemicals, Inc., Wayne, Pa.

[22] Filed: Oct. 18, 1972

[21] Appl. No.: 298,582

[52] U.S. Cl..................... 23/288 F, 55/387, 60/295, 60/301, 220/25, 220/44 A, 292/260
[51] Int. Cl.......... B01j 9/04, F01n 3/14, F01n 3/16
[58] Field of Search............. 23/288 F; 60/288, 299, 60/295, 301; 55/387, 498, 510; 220/55 C, 25 A, 44 A; 292/260

[56] References Cited
UNITED STATES PATENTS

| | | | |
|---|---|---|---|
| 3,124,930 | 3/1964 | Powers | 23/288 F |
| 3,445,196 | 5/1969 | Thomas | 23/288 F |
| 3,449,086 | 6/1969 | Innes | 23/288 F |
| 3,477,210 | 11/1969 | Hervert | 55/387 |
| 3,597,165 | 8/1971 | Keith et al. | 60/299 X |
| 3,644,098 | 2/1972 | De Palma et al. | 60/295 X |
| 3,696,618 | 10/1972 | Boyd et al. | 23/288 F X |
| 3,699,683 | 10/1972 | Toutellotte | 60/301 X |
| 3,713,782 | 1/1973 | Watt | 23/288 R |

Primary Examiner—Joseph Scovronek
Assistant Examiner—Michael S. Marcus
Attorney, Agent, or Firm—Richard A. Dannells, Jr.; Barry Moyerman

[57] ABSTRACT

In a converter for the catalytic treatment of engine exhaust gases which includes an inlet conduit, a catalyst chamber, a particulate catalyst and an outlet conduit, the improvement comprises a sock of a thermally destructible material which contains the catalyst and is mountable within the chamber. The sock becomes completely decomposed and eliminated in situ during the initial operation of the converter.

7 Claims, 5 Drawing Figures

PATENTED DEC 10 1974 3,853,483

EXHAUST GAS CATALYTIC TREATMENT SYSTEM

BACKGROUND OF THE INVENTION

1. Field of the Invention

This invention relates to an improved type of converter adapted to hold a bed of particulate catalyst for treating exhaust gases from an engine capable of emitting combustion gases. More particularly, the apparatus of the present invention provides an improved catalytic converter which eliminates the loading and servicing disadvantages of using a particulate catalyst for treating exhaust gases from internal combustion engines and gas tubines.

Concern over the polluting effect of exhaust gases being emitted from the internal combustion engine has prompted inventors almost from the beginning of the motor age early in the twenty century, to reduce to practice a host of exhaust gas purifiers, converters, catalytic mufflers and other exhaust gas treatment systems. In recent years, this concern has increased to the point that state laws have been proposed to eliminate the internal combustion engine entirely.

The Federal Government through the Environmental Protection Agency (EPA) has established national primary and secondary ambient air quality standards for six air pollutants including sulfur oxides, particulate matter, carbon monoxide, hydrocarbons, photochemical oxidants and nitrogen oxides. Thus, there is a tremendous need in the automotive industry for a realistic solution to the problem of meeting the very stringent specifications of the Federal Standards as established by the EPA.

One of the solutions to this problem is to install in the automotive exhaust gas system a catalytic converter containing a bed of a particulate catalyst which is designed to oxidize carbon monoxide and unburned hydrocabons and to convert them into carbon dioxide and water and to convert nitrogen oxides into nitrogen and oxygen. It is now generally recognized that catalyst systems have been developed to convert these exhaust gases into a harmless form. However, other problems associated with the use of the large volumes of catalyst required and the whole concept of placing such a relatively comlicated catalytic device on every motor vehicle being produced and sold to the motoring public has been met with a cool reception in the automobile industry.

The problems include the bulk handling of literally millions of pounds of catalyst particles by craftsmen completely unfamiliar with such materials. They also include overcoming the relatively large pressure drop that occurs across the exhaust gas inlet and the outlet. Another problem associated with the use of catalytic converters has been the deactivation of the catalyst after a finite length of time. It has been found that in some severe cases for the size of catalyst bed that is required because of the space limitations in a particular vehicle, that the catalyst becomes deactivated in as little as 2,000 miles of useage.

2. Prior Art

One prior art solution to the problem of handling large volumes of catalyst particles has been for the catalyst manufacturer to preform the catalyst into a monolithic structure which can be shipped to the automobile manufacturers for insertion into the converters; see for example U.S. Pat. Nos. 2,106,910 and 3,533,753. However, it has been found that such monolithic catalyst structures chip and break up during shipment, that close dimensional tolerances must be kept in order for the rigid structures of the monoliths to fit within the spaces provided in the exhaust devices, that the monoliths require relatively costly manufacturing procedures for their production and that the monoliths do not afford as efficient a utilization of catalytic components as does a particulate catalyst.

Representative prior art that relates to the use of relatively small beds of particulate catalyst in order to solve the pressure drop problem and deactivation problem include U.S. Pat. Nos. 2,909,415, 3,061,416 and 3,380,810 and 3,186,804 and 3,445,196, respectively. However, all such solutions have associated therewith the problem of handling large volumes of particulate catalyst.

There is a long heartfelt need for a mechanically simple, inexpensive converter that permits easy handling of the necessary large volumes of catalyst in the manufacture of the converter. There is a great need for a converter which at the same time maintains the pressure drop at acceptable levels. Finally there is a great need for a converter which solves these problems as well as one that permits ease of catalyst removal and loading in order for the spent catalyst to be regenerated for reuse and for the fresh and/or regenerated catalyst to be reloaded into the converter.

SUMMARY OF THE INVENTION

With the present invention, there is provided in a converter for the catalytic treatment of engine exhaust gases including an inlet conduit, a catalyst chamber, a particulate catalyst and an outlet conduit, the improvement which comprises a thermally destructible sock which contains the catalyst therein and is disposed within the chamber.

A suitable particulate catalyst is loaded in and otherwise encapsulated in the sock in the shape desired for the particular catalytic converter and the prepackaged catalyst within the sock is shipped to the automobile manufacturer. The catalyst-filled socks are then inserted in the converters by techniques which will be described in more detail below. The socks are readily adapted to fit the converters that may contain irregularities due to fabrication.

Any of the well known packaging materials are envisioned as suitable materials for the use in the manufacture of the socks, e.g., paper, plastics and cloth. The specific materials for this service include those that are thermally decomposed either after the sock has been installed in the converter at the converter assembly plant site or during the intial operation of the converter within the automotive exhaust system. In order to prevent the sock from momentarily blocking the exit of exhaust gases, the sock must contain at least one opening prior to the time the engine is first fired. For example, if a thin, solid material such as polyethylene film were shrink-wrapped around a bed of particulate catalyst to act as the sock element of the invention, the film must be at least partially destroyed after the sock is installed in the converter at the plant site. This problem can easily be solved by a number of ways including passing the converters containing the plastic wrapped catalyst bed through a tunnel furnace. Preferably, the sock is manufactured of a foraminous material to avoid the latter problem. The size of the openings in this material should be slightly less than the minimum practical particle diameter of the catalyst, e.g., approximately 1 mm. The material should be of the type that becomes completely eliminated from the converter under the normal operating conditions of an exhaust system.

A partial list of suitable materials for this purpose are selected from the group consisting of paper and nylon mesh, cloth or silk, cotton, and synthetic materials such as rayon polyesters and the like, and homopolymer and copolymer films of various thermoplastics including polypropylene, polyethylene, polybutene, polystyrene, polyvinyl, chloride, polyurethanes, polyesters, polyamides and the like and mixtures of such polymers. It is even contemplated that cheese cloth coated with a low melting wax to give the cloth dimensional stability can be used for this purpose. If a polymeric film were used as the material for the sock, it is preferable that it contain small openings as discussed in the preceding paragraph. One method of accomplishing this is to add a blowing agent to the polymeric material prior to its extrusion into the film. The type and size of the openings in the film can be controlled by any of the well know post-extrusion techniques for drawing and stretching the film from the extruder; see U.S. Pat. No. 3,403,203.

In one embodiment of the present invention, the converter comprises a catalyst chamber having a removable cover plate, an interior perforated carriage having an inlet peforate wall and outlet perforate wall to provide for the exhaust gases to flow therethrough, a thermally destructible sock contained within the perforated carriage, a particulate catalyst contained within the sock, inlet means through the catalyst chamber in fluid communication with a manifold section of an internal combustion engine and the inlet perforate wall, and a treated gas outlet means from the chamber in fluid communication with the outlet perforate wall.

It is envisioned in this embodiment that the sock for the converter be initially charged with a sufficient amount of catalyst to remain active for at least 10,000 miles under normal operating conditions. After the automobile into which such a converter is placed has been in operation for 10,000 miles, the charge of catalyst can be easily replaced at any service station or garage that stock a supply of socks containing the exact amount of catalyst charge for the particular converter model. A system could be worked out whereby an inspection sticker is placed on a new car or truck at the time it is purchased. The sticker, for example, expires in 6 months. The owner or user must then report to a designated service station where the attendant removes the cover plate and the spent or partially spent catalyst, installs the sock containing the new regenerated charge of catalyst into the converter and replaces the cover. A new sticker is then substituted for the old one indicating a new expiration date in much the same manner as the motor vehicle inspection systems for many states, e.g., New Jersey, Pennsylvania and many others. The service station attendants that handle such converters can easily remove the partially or totally spent particulate catalyst by many techniques including the use of industrial vacuum cleaners, collect the spent catalyst and return it either to the automobile manufacturer or the catalyst supplier for either regeneration or recovery of the valuable metal contained therein.

In another embodiment, an elongated, perforated annular cartridge is either removably or fixedly attached within the catalyst chamber and the thermally destructible sock suitably shaped to fit snugly within the cartridge encloses a bed of particulate catalyst having height to depth ratio in the range of about 2:1 to 10:1 and a depth of at least 20 mm. The perforations in the cartridge should be sufficient to contain the smallest catalyst particles. Typically, the catalyst is in the form of spheres, cylinders or pellets having dimensions in the range of 1.5 mm. to 6.5 mm. (about 1/16 inch to ¼ inch). In this embodiment all of the disadvantages of the prior art converters have been eliminated including the problems of the pressure drop, the handling of large volumes of particulate catalyst and the removal and replacement of the catalyst at periodic intervals.

Still another embodiment of this invention comprises a converter having the foregoing elements wherein seal means are removably disposed at the extremities of the cartridge to prevent channeling of the exhaust gases due to the wall effect and/or catalyst shrinkage.

DESCRIPTION OF THE DRAWINGS AND PREFERRED EMBODIMENTS

Other advantages of the present invention will become evident from the following description and drawings in which.

Figure 1:
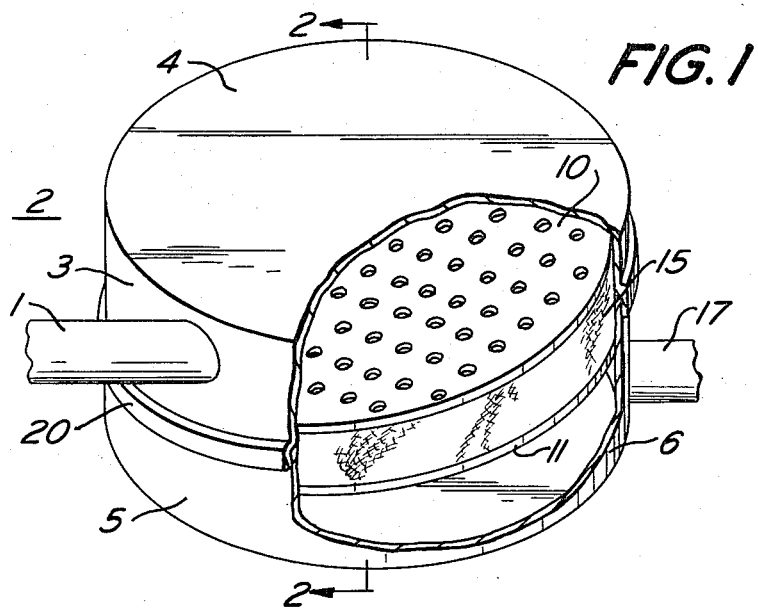
FIG. 1 is an isometric view of one embodiment of a converter within the scope of the present invention, with a cutaway view of its intervals.
Figure 2:
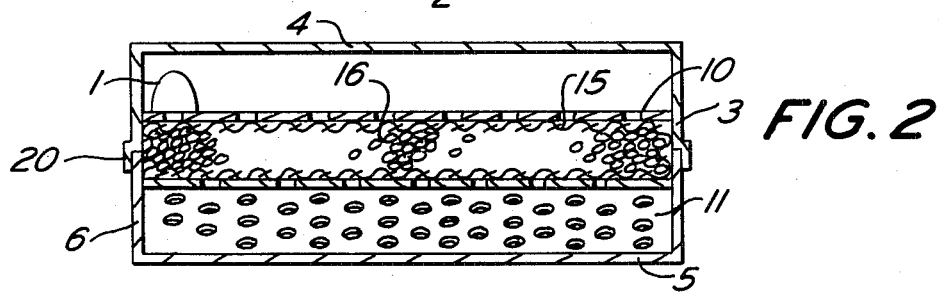
FIG. 2 is a cross-sectional view taken along 2—2 of the converter illustrated in FIG. 1.

Referring now to FIGS. 1 and 2, hot exhaust gases containing noxious components such as nitrogen oxides, residual hydrocarbon vapor and carbon monoxide as well as carbon dioxide and nitrogen, which are derived from, for example, a gasoline buring automobile engine, are passed via inlet conduit 1 into the converter 2 defined by top cylindrical wall 3, top circular wall 4, bottom circular wall 5 and bottom cylindrical wall 6. Mounted within converter 2 is inlet perforate wall 10 and outlet perforate wall 11 which provides a catalyst-retaining section therebetween. Initially, thermally destructible sock 15 filled with particulate catalyst 16 is placed between perforate walls 10 and 11. The oxidized and/or reduced exhaust gases pass through outlet conduit 17 through the tail pipe of the vehicle (not shown).

Particulate catalyst 16 may consist of reforming catalysts or any of the known catalytic agents for the treatment of exhaust gases as described in U.S. Pat. Nos. 2,723,947, 3,259,589, 3,269,958, 3,316,057, and 3,388,077. For example, catalyst 16 comprises a metal selected from the group consisting zinc, cadmium, nickel, iron, platinum, palladium, copper, manganese, vanadium, tantatum, columbium, cobalt, chromium, molybdenum, tungsten, rhenium and mixtures thereof including both its elemental and oxide form. The metal may be suitably promoted by alkali or alkaline earth metal oxides or carbonates, such as the oxides or carbonates of sodium, potassium, calcium, manganese and the like which are preferably deposited on a suitable carrier such as kaolin, silica, alumina, zeolite and mixtures thereof.

The catalytic converter is fabricated, for example, by first fabricating an upper section and a lower section. The upper section comprises inlet conduit 1, top cylindrical wall 3, top circular wall 4 and inlet perforate wall 10. The lower section comprises outlet conduit 17, bottom cylindrical wall 16, bottom circular wall 5 and outlet perforate wall 11. Sock 15 containing the necessary catalyst charge for the catalytic retaining section is dropped from a suitable chute (not shown) onto outlet perforate wall 11 of the lower section. The flange portion 20 of the upper section is positioned on top of the lower section and the two sections are sealed shut, for example by resistant welding or any other known means. Sock 15, as indicated above, comprises a material which becomes completely decomposed and eliminated from the catalytic converter as soon as the internal combustion engine has been in operation for a few minutes. It has been found that the temperatures during idling exceed 400°F, the temperature at which the preferred material used for sock 15 is decomposed. In any event, the material should be of a type that is completely decomposed at a temperature in the range of about 1,000° to about 1,800°F which is the normal temperature range for the exhaust gas system. In a preferred embodiment, the materials used for sock 15 are foraminous and thus no special procedures need be taken to insure free passage of gases through the exhaust gas system during this initial startup of the engine.

Although the foregoing description relates to a converter having a specific configuration, converters having a variety of configurations well known in the art are within the scope of the present invention.

Figure 3:
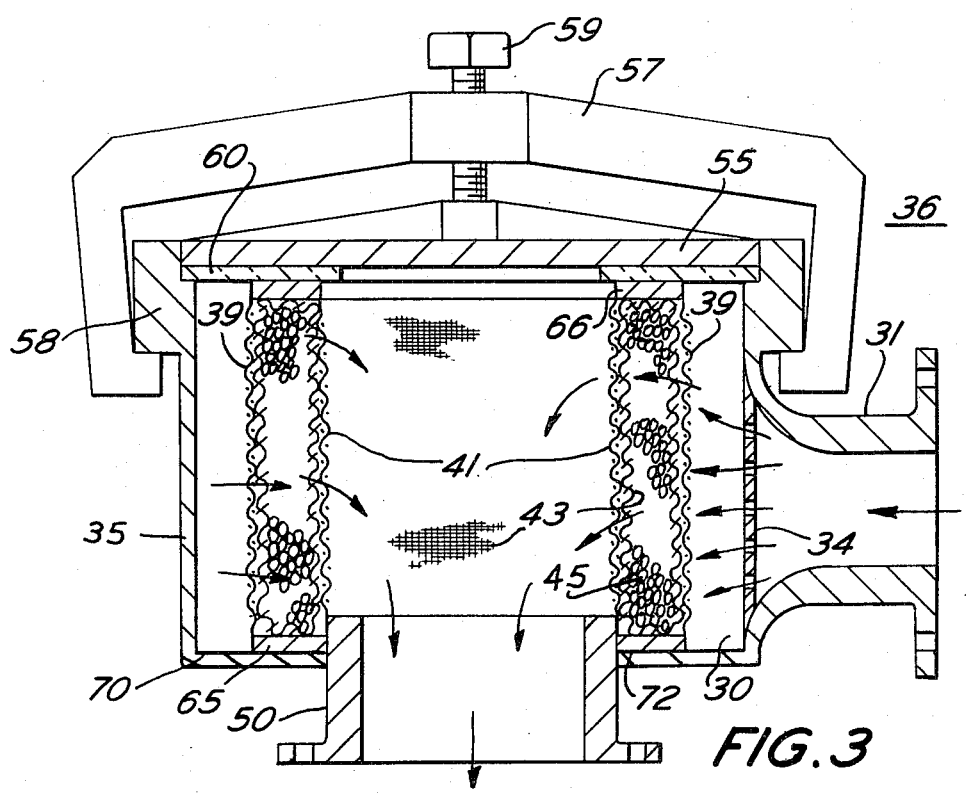
FIG. 3 is a sectional elevation view of another embodiment of a converter of this invention.
Figure 4:
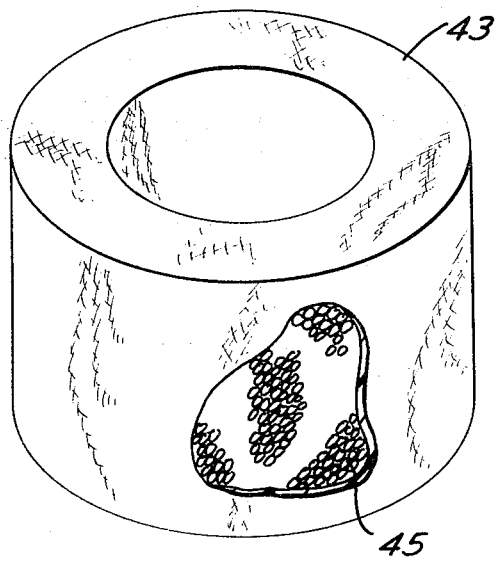
FIG. 4 is an isometric view of the sock containing a particulate catalyst used in the converter illustrated in FIG. 3.

Referring now to FIGS. 3 and 4, an exhaust gas stream passes into inlet annular space 30 through inlet conduit 31 and through diffuser plate 34 which is welded or similarly attached to the opening in cylindrical sidewall 35 of catalytic converter 36. The diffused gas stream passes through an elongated annulus comprising perforated inlet wall 39 and perforated outlet wall 41. The gases initially pass through sock 43 containing particulate catalyst 45. The stream then passes through perforated outlet section 41 and through outlet conduit 50 in an opening in the bottom of converter 36. Removable cover plate 55 is positioned either as shown in an opening at the top of catalytic converter 36 or at the bottom of converter 36 if the entire device is positioned within the exhaust gas system in an opposite orientation from that shown in FIG. 5. The latter arrangement may be desirable so that the spent catalyst can fall by gravity from converter 36 during the periodic removal of spent catalyst 45. Cover plate 55 can be removably attached to converter 36 by any known means such as used with oil filters. A preferred means is shown in which closure clamp 57 is clamped to lugs 58 which form a part of cylindrical wall 35 or are affixed to converter 36. Cover plate 55 is tightened into place by means of bolt 59 which is distally positioned away from the source of the operating temperature of the converter to insure that cover plate 55 is easily removed after the converter has been in use for a long period of time and must be recharged with fresh catalyst. Gasket 60 composed of a thermally nondestructible material such as high temperature asbestos or corrugated metal is disposed between cover plate 55 and inlet annular space 30.

In order to prevent channeling of the exhaust gases to catalyst 45, insert ring 65, which comprises a thermally nondestructible, compressible material at temperatures up to about 2,000°F, such as Cerafelt sold by Johns-Manville, is removably disposed below sock 43 between the lower portions of inlet wall 39 and outlet wall 41. Sock 43 is then inserted into place and insert ring 66 comprising the same type of material as ring 65 is placed on top of sock 43 as shown in FIG. 3. The thickness of each of rings 65 and 66 should be such that when they are initially positioned, ring 66 extends into the opening for cover plate 55 and gasket 60. Rings 65 and 66 are compressed as bolt 59 is tightened into place by an amount that is approximately equal to the decrease in the height of the catalyst bed due to shrinkage. The amount of shrinkage for the type of catalysts used in this service has been found to be in the range of 5 to 10 percent. Thus, after catalyst skrinkage causes the bed to diminish to its minimum height, rings 65 and 66 return to their original thickness. The lower portions of inlet wall 39 and outlet wall 41 are affixed to bottom wall 70 of converter 36 by welding or other means well known in the art. Insert rings 65 and 66 can be eliminated and each of the upper and lower portions of at least inlet wall 39 can comprise a non-perforated barrier to the flow of exhaust gases to prevent channeling. The height of this non-perforated section should be about one half to about two times the thickness of the catalyst bed. Preferably inlet wall 39 and outlet wall 41 are fabricated in the same manner so that they both contain non-perforated end sections and perforated center sections. The combination of these two features as is illustrated in FIG. 3 is preferred in order to eliminate any possibility of channeling of gases. In the combination, it is important that the thickness of each of insert rings 65 and 66 is less, e.g., by about 10 percent, preferably about 50 percent, than the height of one non-perforated section of inlet wall 39.

An alternate procedure (not illustrated in the drawings) for solving the channeling problem as well as to give sock 43 dimensional stability is to first place insert ring 65 in the bottom of sock 43, to then fill sock 43 with the desired amount of catalyst 45, to place insert ring 66 on top of the catalyst bed, and to finally seal or otherwise close the opening in sock 43. The resulting sock has the necessary dimensional stability so that it can be easily inserted into the elongated annulus formed by inlet wall 39 and outlet wall 41 regardless of the type of material used to form the sock. The total height of the sock at this point is designed to be greater than that of the elongated annulus by an amount in the range of about 1 to 2 times the thickness of the bed before the sock is inserted into the annulus. The total amount of compressibility of rings 65 and 66 are designed to compensate for the height of the sock as discussed in the preceding paragraph.

Figure 5:
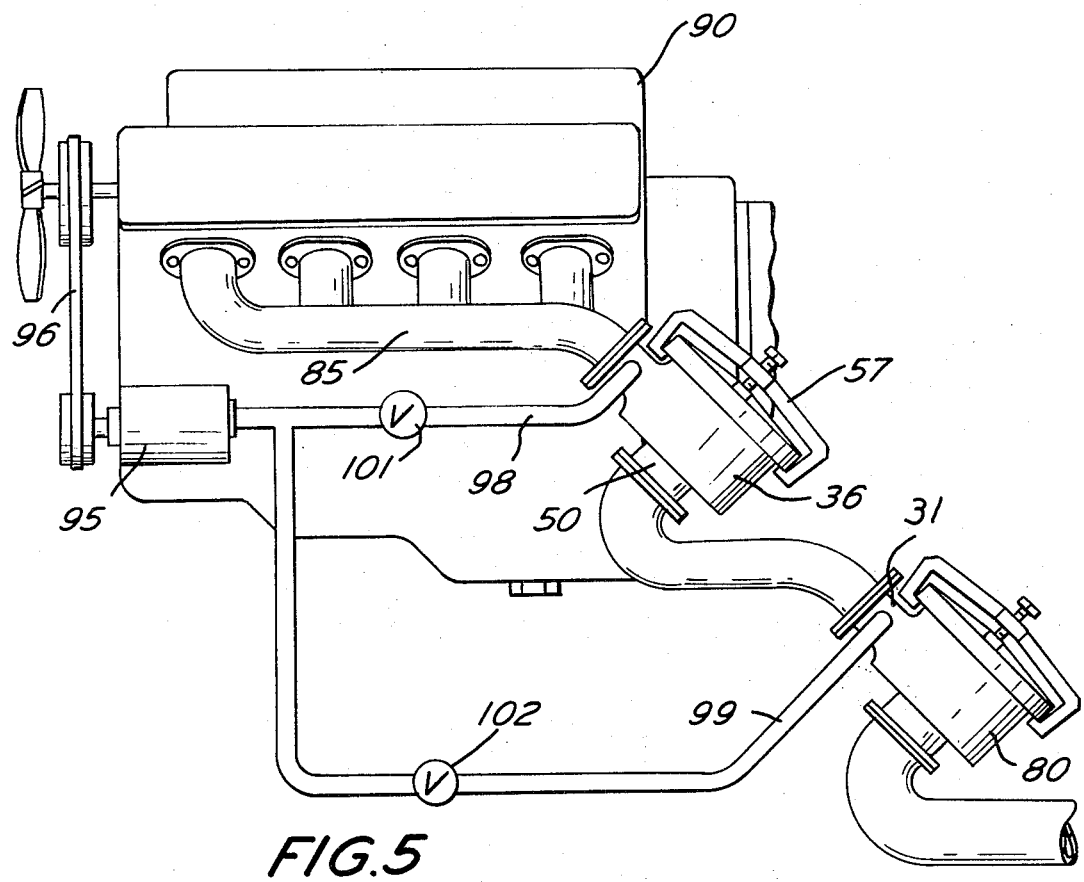
FIG. 5 is a side elevation view of one side of V-8 engine employing two of the converters illustrated in FIG. 3 in series.

Referring now to FIG. 5, there is shown in schematic fashion, catalytic converters 36 and 80 in as close a proximity as possible to exhaust manifold 85 of internal combustion engine 90. This feature permits maximum heat transfer from the engine to the catalyst during warmup. This also permits easy under-the-hood access for periodic catalyst changes. Catalytic converter 80 is the same as that described in connection with FIGS. 3 and 4. Although converter 80 can be loaded with a different type of catalyst than that used in converter 36, it is preferred in the interests of economy and simplicity to use the same type of catalyst in both converters. Air pump 95 is shown connected to fan belt 96. Air pump 95 supplies via inlets 98 and 99 catalytic converter 36 and/or converter 80 with sufficient oxygen to completely oxidize the noxious gases in the exhaust gas stream. Preferably, valve 101 is closed and valve 102 is opened so that air is only supplied to converter 80. In this case, converter 36 is utilized in a reducing mode of operation where, for example, the nitrogen oxides are reduced to nitrogen and oxygen.

Although FIG. 5 only shows one side of a typical V-8 engine, the side of the engine not illustrated is the same as that shown in FIG. 5. However, any practical arrangement of one or more converters in combination with 0, 1, 2 or more air pumps to accommodate the particular requirements of a given vehicle and specifications of established standards is considered to be within the scope of the present invention.

The examples set forth below further illustrate various embodiments of the present invention in an exhaust gas treatment system for a 1970 Chevrolet having a V-8 engine. The system has been designed to meet the very stringent requirements of the 1975 Federal Government Standards for automotive emissions and at the same time maintain an acceptably low pressure drop across the system. The 1975 Federal Standards require 96 and 97 percent removal of carbon monoxide and hydrocarbons, respectively. However, since these values are averaged over a period of time, the system must perform at considerably higher levels for a portion of the time in order to offset the lower values that are obtained during light off, i.e., the temperature of initial ignition of the combustibles in the exhaust gas. A 99.9 percent conversion of a total exhaust gas stream of 200 SCFM containing carbon monoxide and hydrocarbons to carbon dioxide and water vapor at an exhaust gas temperature of 1,000°F is taken as a basis for these examples.

EXAMPLE 1

A converter of the type illustrated in FIG. 1 and 2 is loaded with a sock containing a particulate catalyst and is mounted in the tail pipe section of the automobile. The catalyst that is used in the sock comprises 0.01 wt. % platinum and 0.05 wt. % palladium deposited on spherical alumina having a minimum diameter of 1 mm. and an average particle diameter of 2.1 mm. It has been found that to achieve the foregoing conversion of the gas stream while maintaining the pressure drop across converter 2 to 5 inches of water, the volume of catalyst in the converter is approximately 260 cubic inches at a catalyst bed thickness of 2 inches and a bed diameter of about 13 inches. The catalyst must be changed about every 20,000 miles to maintain this purity.

EXAMPLE 2

Two converters of the type shown in FIGS. 3 and 4 are each loaded with a sock containing the same type of particulate catalyst as that used in Example 1. One converter is mounted on each side of the V-8 engine at close as possible to the exhaust gas manifold. Since the exhaust gas rate for the entire system is 200 SCFM, the gas rate per converter is 100 SCFM. It is found that in order to meet the stringent requirements for automotive emissions while maintaining the pressure drop across the converter at 5 inches of water, the volume of catalyst in converter 36 is 60 cubic inches at a catalyst bed height of 4 inches and a bed thickness of 1.4 inches. This means that the dimensions of sock 43 are 4.8 inches O.D. and 2.0 inches I.D. which is well within the spatial limitations of this under-the-hood exhaust gas system.

EXAMPLE 3

This exmaple illustrates a practical exhaust gas treatment system that not only converts essentially all of the carbon monoxide and hydrocarbons to carbon dioxide and water vapor, but also converts 99.9 percent of the nitrogen oxides to nitrogen and oxygen. The other design constraints followed in Examples 1 and 2 were followed in this example utilizing the embodiment illustrated in FIG. 5 in which two converters are placed on each side of the engine. It is found that in order to achieve the desired purity of the gas stream emitting into the atmosphere while maintaining the pressure drop across the entire gas treatment system, i.e., both converters, at 5 inches of water, the volume of catalyst in converters 36 and 80 is each 60 cubic inches at a catalyst bed depth of 5.6 inches and a bed thickness of 1.1 inches. The same catalyst that was used in Example 2 is used in this exmaple except that the average particle diameter is 2.6 mm. The dimensions of sock 43 in this example are 4.2 inches O.D. and 2.0 inches ID. This exhaust gas treatment system not only meets the 1975 Federal Standards but eliminates all of the other disadvantages noted above in connection with the use of prior art converters.

What is claimed is:

1. A converter containing a bed of particulate catalyst for catalytic treatment of engine exhaust gases comprising a catalyst chamber haviing a substantially vertical sidewall and an opening to receive said catalyst; a removable cover plate mounted over the opening in said chamber; closure clamp clamped to said sidewall of said converter; means attached between said closure clamp and said cover plate for tightening said plate over said opening; and elongated, perforated annular cartridge mounted within said chamber having an inlet perforate wall, an outlet perforate wall and an opening at one end thereof in alignment with the opening in said chamber; a thermally destructible, porous sock containing said catalyst bed in the same geometric configuration as said annular cartridge so that said sock is insertable through the opening in said chamber and into the annulus of said cartridge; inlet means for placing a source of engine exhaust gases in fluid communication with said inlet perforate wall; treated gas outlet means from said chamber in fluid communication with said outlet perforate wall; and seal means removably disposed at the extremities of said cartridge with said sock positioned therebetween for preventing channeling of the exhaust gases at the extremities of said cartridge.

2. The converter of claim 1 wherein said inlet perforate wall has a center, perforated section between its outer extremities thereof and non-perforated end sections at its outer extremities, and the height of each of said end section is at least one half the thickness of said catalyst bed.

3. The converter of claim 1 wherein said seal means comprises a pair of thermally non-destructible, compressible rings with said catalyst bed positioned therebetween.

4. The converter of claim 3 wherein said pair of rings are disposed within said sock to impart dimensional stability to said sock as it is inserted into said annulus.

5. The converter of claim 4 wherein the height of said sock is greater than that of said annulus by an amount in the range of about one to two times the thickness of said bed, before said sock is inserted into said annulus, and wherein said rings are compressible to an extent equal to this amount.

6. The converter of claim 5 wherein closure means is operably connected to said cover plate and is distally positioned away from the flow of the exhaust gases for gradually tightening said cover plate in place over the opening in said chamber after said sock is inserted therein and for compressing said rings.

7. The converter of claim 6 wherein said inlet perforate wall has a center, perforated section between its outer extremities thereof and non-perforated end sections at its outer extremities, and the height of each of said end section is at least one half the thickness of said catalyst bed.

* * * * *